Aug. 6, 1940.  D. A. YOUNG  2,210,698

INDICATING INSTRUMENT

Filed March 6, 1937

WITNESSES:

INVENTOR
Douglass A. Young
BY
ATTORNEY

Patented Aug. 6, 1940

2,210,698

UNITED STATES PATENT OFFICE 2,210,698

INDICATING INSTRUMENT

Douglass A. Young, East Orange, N. J., assignor to Westinghouse Electric & Manufacturing Company, East Pittsburgh, Pa., a corporation of Pennsylvania Application March 6, 1937, Serial No. 129,440

3 Claims. (Cl. 240—2.1)

My invention relates generally to indicating instruments, particularly of the voltmeter and ammeter type, and relates specifically to an improved device for illuminating the face of such type instrument to facilitate the reading thereof.

In many cases it is desirable to illuminate instruments of this general type to insure that the reading is correct, but it has usually been difficult to provide a means for accomplishing the purpose without entailing substantial expense or illuminating the instrument face in a manner which makes the reading thereof uncomfortable.

It is an object of the invention therefore to provide a cheap and efficient means for illuminating the face of an instrument, which may be readily detached from the instrument for renewal of the source of illumination without necessitating the manipulation of circuit conductors.

Other objects of the invention will be apparent from the following description and accompanying drawing in which.

Figure 1:
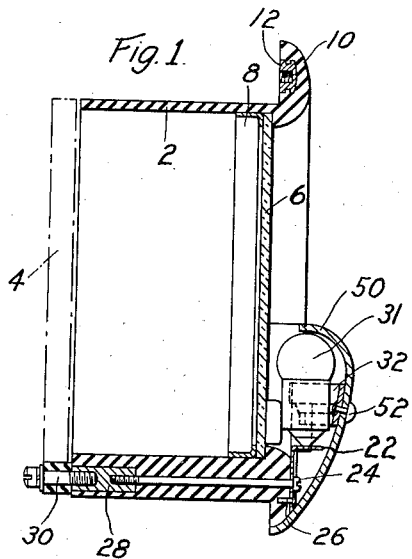
Figure 1 is a view in central vertical section of an instrument casing in accordance with the invention.
Figure 2:
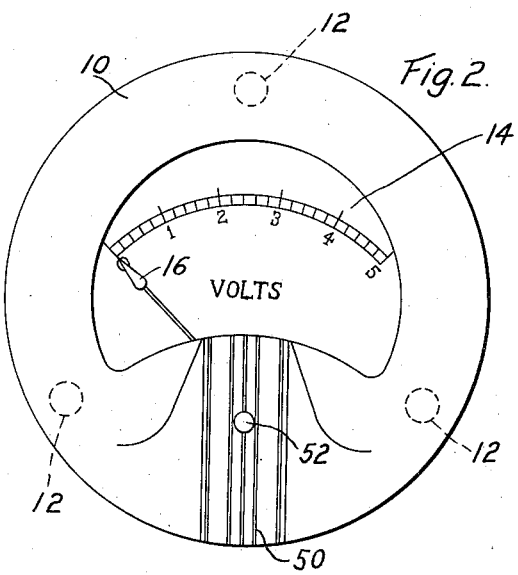
Fig. 2 is a view in front elevation of the instrument casing shown in Fig. 1, with certain additions.
Figure 3:
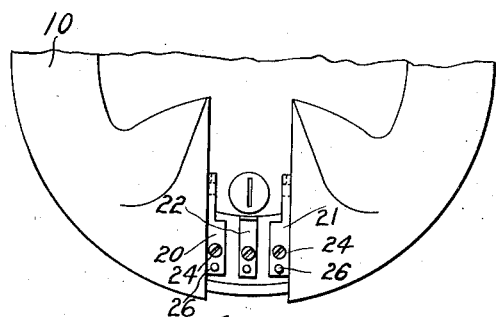
Figure 4:
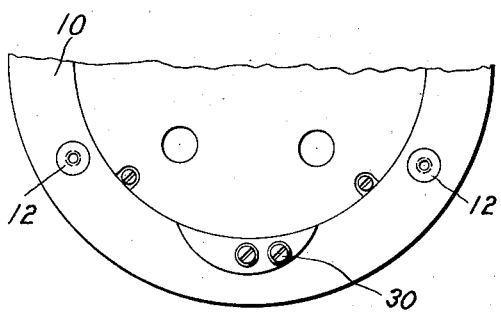
Figure 5:
Figure 6:
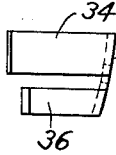

Figs. 3 and 4 are broken detail views of the front and back of the casing shown in Figs. 1 and 2, and Figs. 5 through 8 are detail views of the circuit terminals employed in practicing the invention.

Referring more particularly to Figs. 1 and 2, the instrument casing comprises, by way of illustration, a substantially circular body portion 2 having a rear closure 4 shown in dotted lines in Fig. 1, suitably secured to the body portion in a removable manner in accordance with usual practice, as by screws as shown in Fig. 4. The front of the instrument casing is closed by a transparent portion 6, such as glass, maintained in place by a spring ring 8, as shown more clearly in Fig. 1. The front edge of the casing is provided with a circular flange 10 having molded therein threaded inserts 12 to facilitate the securing of the instrument to a support, preferably three of such inserts 12 are provided as indicated in Fig. 2.

For purposes of convenience, the movement of the indicating instrument is omitted from Fig. 1, but as indicated in Fig. 2, it includes a usual dial plate 14 and an indicating hand 16.

As shown more clearly in Fig. 3, the central portion of the rim of the instrument is removed and three circuit terminals 20, 21 and 22 are secured to the casing by means of screws 24 and pins 26. Each of the screws 24 may extend through an enlarged section of the instrument casing into threaded engagement with a metal insert 28 which is, in turn, engaged at its opposite extremity by a terminal screw 30 to which suitable circuit connection may be made. As it will appear hereinafter, it is only necessary to make the circuit connection to the terminal 20 or the terminal 21, not both.

The illumination of the instrument is accomplished by a small electric light bulb 31 which is engaged by a bracket 32 having arms 34, which surround the cylindrical base terminal of the lamp, and outwardly projecting arms 36 for a purpose hereinafter described. The lower terminal of the lamp is intended to engage frictionally an outwardly extending portion on the central circuit terminal 22 on the instrument rim. The details of the clip 32 are shown more in detail in Figs. 5 and 6.

Figures 7, 8:
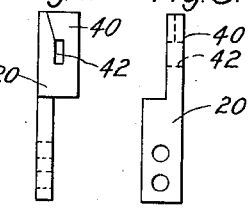

Each terminal 20 and 21, as shown in Figs. 7 and 8, comprises an upwardly extending portion 40 extending at right angles to the plane of the instrument rim and is provided with an aperture 42 in a position to receive the outwardly extending portions 36 of the bracket 32 when the lamp is in position. The bracket 32, being of resilient material, may readily be pushed against the terminal extensions 40 on the rim and snap into the apertures 42 to maintain the lamp in position. When in this position, the lower terminal of the lamp bulb frictionally engages the extended portion of the circuit terminal 22. The lamp may readily be removed by merely pulling it to disengage the extensions 36 from the apertures 42.

In order to render the illumination of the instrument more effective and to produce a more pleasing appearance of the instrument as a whole, a shield 50, having an upper portion extending over the lamp bulb and a lower portion conforming to the contour of the instrument rim, may be employed. Such shield may be secured to the bracket 32 as by a small rivet 52 (Figs. 1 and 2) and be of such width that it completely masks the opening or slot in the instrument rim in which the contact terminals and lamp are disposed. Preferably the upper portion of the shield 50 extends over the lamp bulb a sufficient distance to prevent light rays falling on the eyes of the reader, and in addition the shield tends to confine all of the light rays to the instrument face, and should be of such width that the entire area of the face is illuminated, or at least sufficient of it to illuminate the full length of the instrument scale.

In accordance with the construction described, the invention results in an illuminated instrument of pleasing appearance and desirable mechanical construction. Quite apparently many modifications are possible in the construction disclosed and it is intended that the invention shall not be limited except by the scope of the appended claims.

I claim as my invention:

1. A casing for an instrument having indicating means comprising a light permeable member for exposing said indicating means, a rim structure bordering the exterior periphery of said light permeable member and provided with a recess, said rim structure and light permeable member providing a substantially closed face for said casing, a light source positioned in said recess adjacent said light permeable member, and a shield device for covering said recess, said shield device and rim structure substantially covering said light source but having an opening adjacent the exterior surface of said light permeable member for directing a beam of light from said source over a substantial part of said light permeable member, said shield device and light source being removable as a single unit from said rim structure.

2. A device of the class described comprising an annulus adapted to frame the face plate of an indicating instrument, a portion of the inner periphery of said annulus spanning said face plate, a recess in said annulus extending from the outer periphery to the inner periphery of that portion of said annulus which spans said face plate, a protuberance constituting a continuation of the outer surface of said annulus and terminating adjacent opposite side edges of said recess, means for mounting a lamp in said recess including a removable lid for concealing the contents of said recess, said removable lid and a lamp mounted in said recess being removable as a single unit from said protuberance, and means adjacent the side edges within said recess for receiving said removable lid.

3. A casing for an instrument having indicating means comprising a light permeable member for exposing said indicating means, a rim structure bordering the exterior periphery of said light permeable member, said rim structure and light permeable member providing a substantially dust-proof face for said casing, a light housing for said casing including a protruding structure carried by said casing and having a contour merging into the contour of the rim structure for providing a recess adjacent said light permeable member, and a shield section for covering said recess, an electric light source positioned in said recess adjacent said light permeable member, said light housing substantially covering said light source but having an opening adjacent the exterior surface of said light permeable member for directing light from said source over a substantial part of said light permeable member, said shield section and said light source being detachable as a single unit from said rim structure, and electro-conductive means associated with said casing for establishing an energizing circuit for said electric light source.

DOUGLASS A. YOUNG.